UNITED STATES PATENT OFFICE.

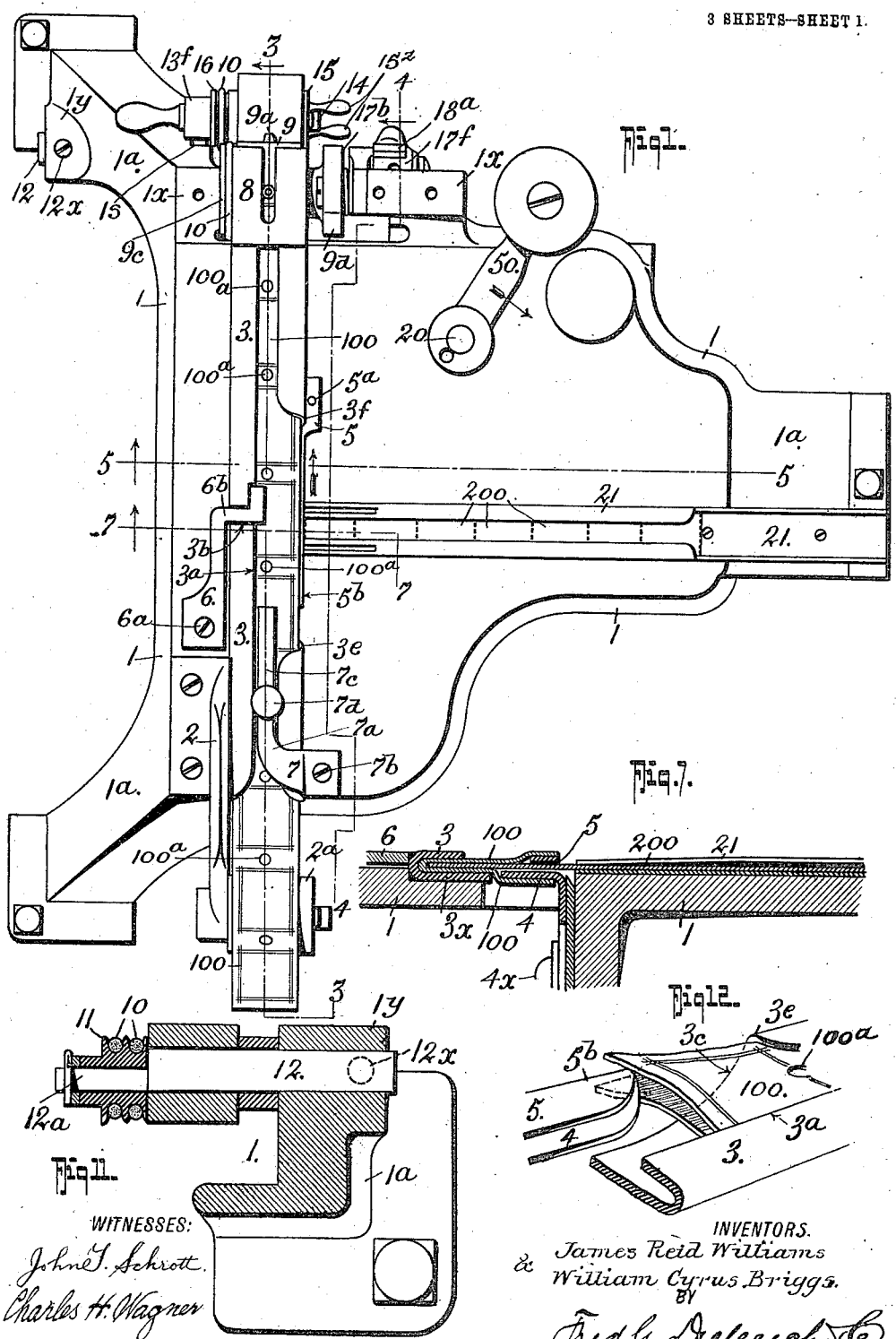

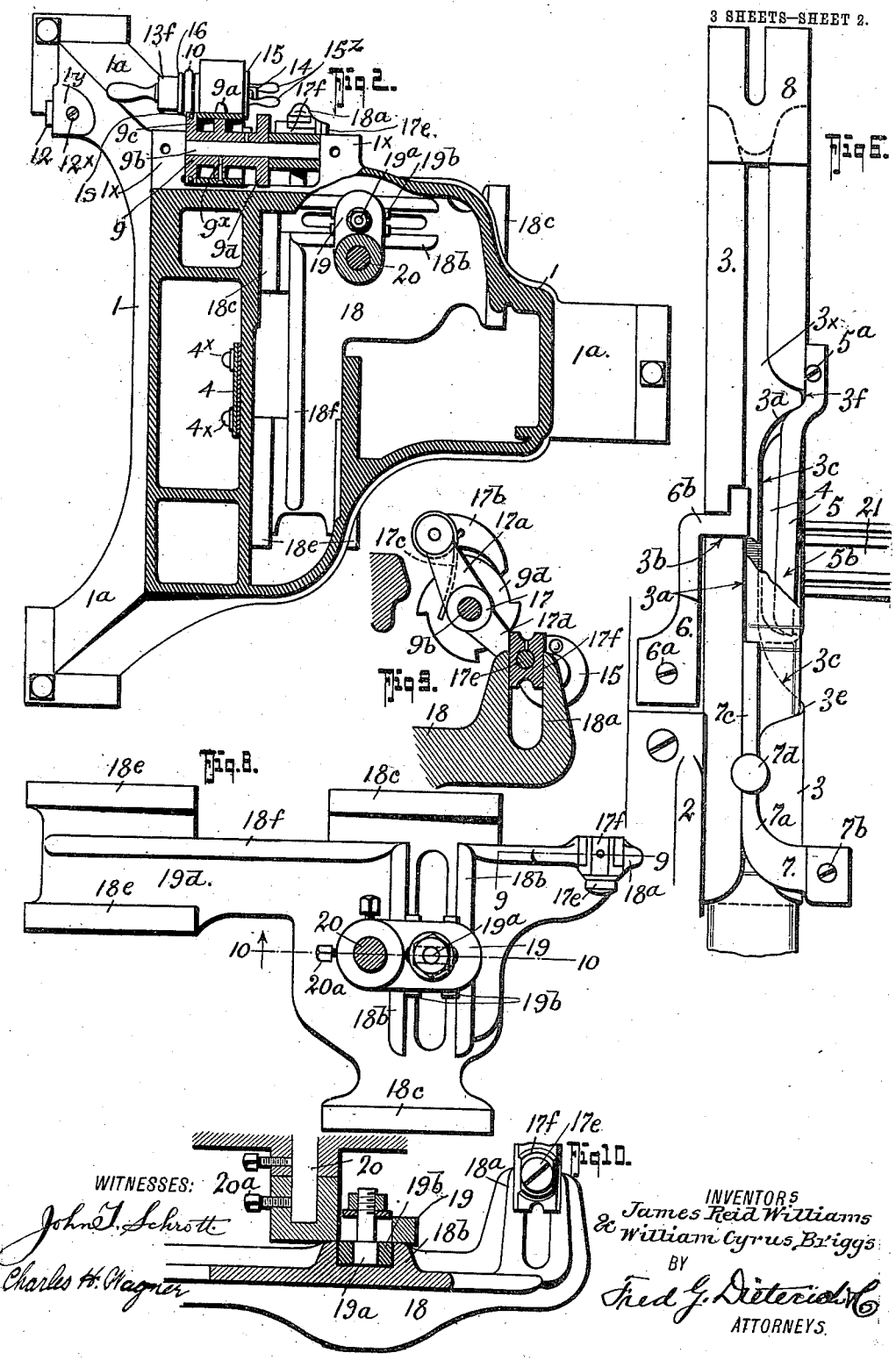

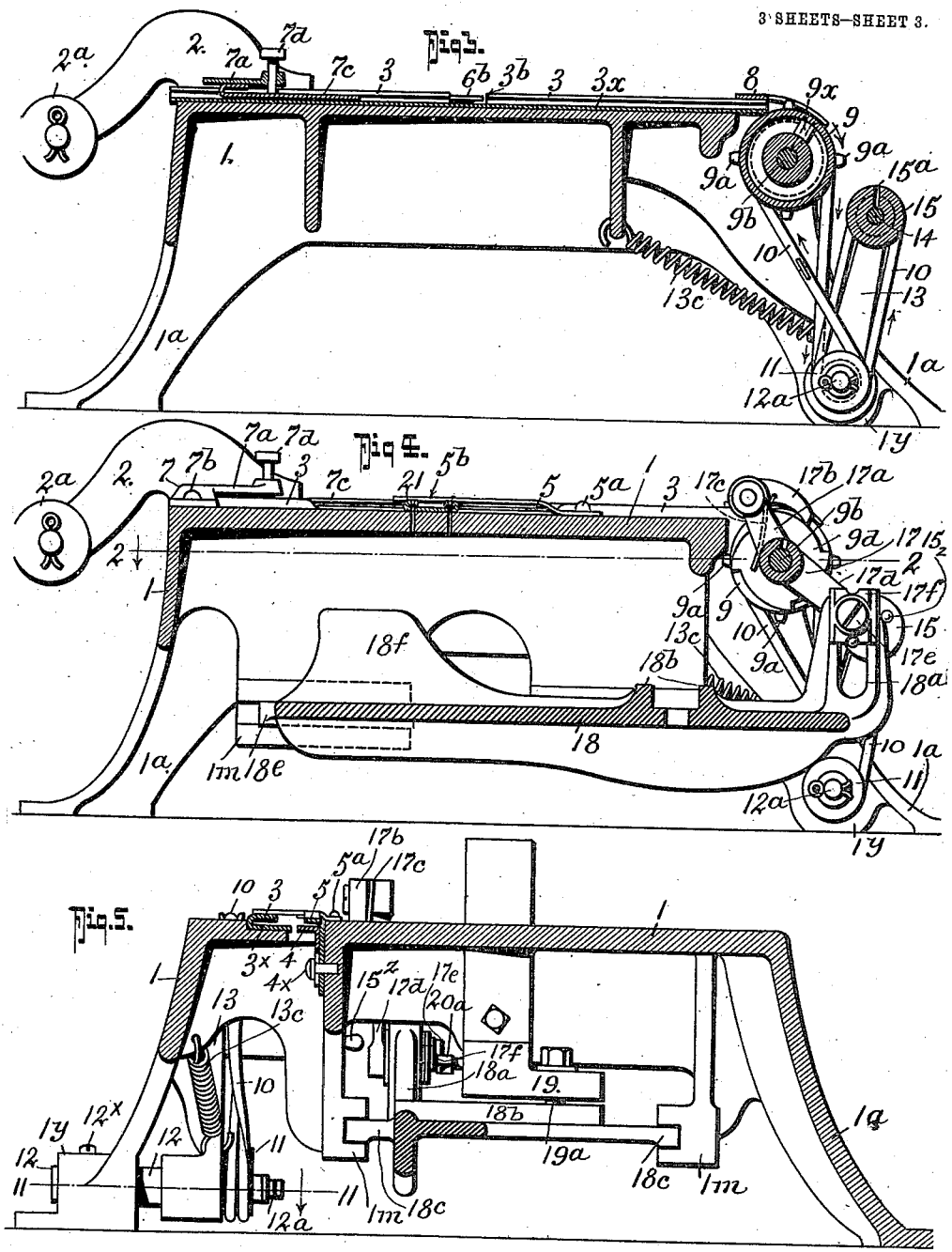

WILLIAM C. BRIGGS, OF WINSTON SALEM, AND JAMES R. WILLIAMS, OF WILMINGTON, NORTH CAROLINA, ASSIGNORS, BY MESNE ASSIGNMENTS, TO J. W. MURCHISON, OF WILMINGTON, NORTH CAROLINA, AND J. R. WILLIAMS, OF NEW YORK, N. Y.

ENVELOP-FEEDING MECHANISM FOR ENVELOP-LOADING MACHINES AND THE LIKE.

987,851. Specification of Letters Patent. Patented Mar. 28, 1911.

Original application filed August 20, 1908, Serial No. 449,486. Divided and this application filed January 12, 1909, Serial No. 471,923. Renewed August 6, 1910. Serial No. 576,019.

*To all whom it may concern:*

Be it known that we, WILLIAM C. BRIGGS and JAMES R. WILLIAMS, residing, respectively, at Winston Salem and Wilmington, in the counties of Forsyth and New Hanover and State of North Carolina, have invented certain new and useful Improvements in Envelop-Feeding Mechanism for Envelop-Loading Machines and the Like, of which the following is a specification.

Our present invention, which is a divisional part of our co-pending application filed August 20, 1908, Serial No. 449,486, comprises in its generic nature a mechanism for feeding a continuous envelop from a reel onto another reel while passing by a loading apparatus.

In our original application, hereinbefore referred to, we have shown and described a complete envelop loading machine of which the present application forms a divisional part, in that the claims of this application are drawn to the strip or envelop feeding mechanism and its special coacting parts, the means for feeding the vendible article into the envelop and the combination of such means with the strip feeding mechanism forms the subject-matter of our original application, hereinbefore referred to, and in this application no claim is made to the specific construction of any vendible article feeding mechanism for feeding vendible articles into the envelop.

In its more detail nature the invention embodies those novel details of construction, combination and arrangement of parts, all of which will be first fully described, then be specifically pointed out in the appended claims, and illustrated in the accompanying drawings, in which:

Figure 1, is a top plan view of our machine. Fig. 2, is a horizontal section on the line 2—2 of Fig. 4. Fig. 3, is a vertical section on the line 3—3 of Fig. 1. Fig. 4, is a vertical section on the line 4—4 of Fig. 1. Fig. 5, is a vertical section on the line 5—5 of Fig. 1. Fig. 6, is a detail view of the continuous envelop strip guide. Fig. 7, is an enlarged detail section on the line 7—7 of Fig. 1. Fig. 8, is a detail view of the sliding carriage hereinafter referred to. Fig. 9, is a cross section on the line 9—9 of Fig. 8. Fig. 10, is a cross section on the line 10—10 of Fig. 8, looking in the direction of the arrow. Fig. 11, is an enlarged cross section on the line 11—11 of Fig. 5. Fig. 12, is an enlarged detail perspective view of the envelop opening means.

Referring now to the accompanying drawings in which like numerals and letters of reference indicate like parts in all of the figures 1 represents the main casting or frame, which includes the legs $1^a$. Secured to the casting 1 is a bracket 2 that carries an idler pulley $2^a$ on which the reel of continuous envelops 100 is primarily placed. The strip guide 3 guides the envelop from the reel past the loading point and winds it up in a reel-form on a drum 15, hereinafter referred to, after the envelop has been loaded. The guide 3 preferably consists of a sheet metal body of flat tubular form in cross section, and having a longitudinal opening $3^a$ in its upper surface with which a transverse opening $3^b$ merges at one side and a larger opening $3^c$ on the other side. Below the opening $3^c$ in the upper surface of the guide 3, the lower surface $3^x$ is cut away at $3^d$, the cut away portion having curved terminations $3^e$, $3^f$, for a purpose which will be presently more fully explained.

4 and 5 represent the envelop openers, the opener 4 lying in the same plane, or slightly above that of the bottom $3^x$ of the envelop guide 3, and being secured by screws $4^x$ to a part of the main frame 1, while the opener 5 is secured at one end as at $5^a$ to the main frame or casting, leaving a resilient knife-like portion $5^b$, lying in a plane above that of the opener 4 and substantially in the same plane with the top of the guide 3.

6 designates a presser which is secured at $6^a$ to the casting 1 and is bent as at $6^b$ to enter the cut-away portion $3^b$ of the guide 3, and press upon the envelop, the presser 6 being resilient to permit the proper "give" as the vendible article is inserted into the envelop pocket.

7 designates a tension device which comprises a bracket $7^a$ secured at $7^b$ to the casting 1, and provided with a resilient arm $7^c$, whose tension is controlled by a set screw $7^d$ so that the proper pressure may be applied to the envelop 100 as it passes through the guide 3, for a purpose presently more fully apparent.

The guide 3, at its outer end, terminates in a guard 8 which projects over a feed drum 9, which has spikes or pins $9^a$ to project through apertures $100^a$ in the envelop 100 and draw the envelop through the guide 3 from its reel. The free end of the envelop strip is inserted into a slot $15^a$ on the "wind-up" drum 15, that is mounted on a shaft 14 and driven through the medium of an endless belt 10 that passes around the pulley 16 on the shaft 14, the shaft 14 being mounted in a bearing $13^f$ in an arm 13, hereinafter again referred to. The feed drum 9 is mounted on a shaft $9^b$, and secured thereto by a set screw $9^x$, the shaft $9^b$ being mounted in bearings $1^x$ to the main frame or casting 1, and the drum also is formed with a grooved pulley $9^c$, over which the endless belt 10 passes, and with a ratchet disk $9^d$ to coöperate with an operating pawl $17^d$, as fully apparent by reference to Fig. 4, of the drawings.

12 designates a shaft mounted in a bearing of the casting 1 and secured from rotation by a set screw $12^x$. The shaft 12 carries an eccentric stub shaft $12^a$ on which a double grooved pulley 11 is mounted. Around the pulley 11 the endless belt 10 passes. By rotating the shaft 12 in its bearings $1^y$ and holding it by the set screw $12^x$ the tension of the belt 10 may be adjusted at will to loosen or tighten the same.

On the shaft 12 is an arm 13 that carries the shaft 14 and the arm 13 is held with the "wind-up" pulley 15 adjacent to the feed drum 9 by a spring $13^c$ that is secured to the arm 13 and to a fixed part of the main frame or casting 1, the movement of the arm 13 under the influence of the spring $13^c$ being limited by a stop $1^s$ on the main frame 1.

The arm 17, which is mounted on the drum shaft $9^b$, has a short lever portion $17^a$ to which the pawl $17^b$ is pivoted, and spring pressed into engagement with the ratchet disk $9^d$, by a spring $17^c$ more clearly shown in Fig. 4, of the drawings. The arm 17 is also provided with a longer lever $17^d$, to the end of which a bearing block $17^f$ is secured on the stub-shaft or bolt $17^e$, the block $17^f$ being vertically slidable on a forked bearing $18^a$, formed with a sliding frame 18 that is reciprocated in a horizontal plane. The sliding frame 18 has slide bearings $18^c$ to slide in bracket guides $1^m$ of the main frame or casting 1, and is also provided with a transverse bearing slide $18^b$ in which the sliding bearing block $19^b$, that is pivoted on a stud bolt $19^a$, operates, the bolt $19^a$ being carried by a crank 19 that is secured to the lower end of the drive shaft 20 by a set screw $20^a$, as shown in Figs. 8 and 10, of the drawings. Power may be applied to the shaft 20 to turn the same by any approved means, such for instance, the crank 50 shown in the accompanying drawings.

From the foregoing description taken in connection with the accompanying drawings, it is thought the complete construction of our invention will be readily understood.

The manner in which the invention operates is as follows: The sales strip or envelop 100 is fed into the guide 3 from the reel with the openers 4 and 5 projected into the strip in a manner indicated in Fig. 12, of the drawings, so as to open the sales strip as it passes across the delivery end of the chute 21, through which the vendible article is fed to the envelop, in any approved manner. The sales strip is threaded through the guide 3 and has its end inserted into the slit $15^a$ of the drum 15, and a few turns taken around the drum 14 by turning the same through the medium of the finger members $15^z$, it being understood that the pins $9^a$ of the drum 9 are inserted into the apertures $100^a$ of the envelop or sales strip 100. The crank 50 is then turned in the direction of the arrow in Fig. 1, which causes the following general action to take place. The strip 100 is fed one step forwardly in the direction of the arrow in Fig. 1, to bring a certain pocket in alinement with the chute 21, after which the movement of the strip 100 through the guide 3 ceases, and one of the vendible articles 200 may be pushed into the pocket in alinement with the chute 21. As soon as the article section has been projected into the envelop pocket, a further movement of the crank 50, in the direction of the arrow in Fig. 1, causes the pawl $17^b$ to engage one of the rack teeth of the disk $9^d$ and rotate the drum 9 forwardly a distance equal to one envelop section, when the foregoing action again takes place.

*Detail description of operation.*—The envelop being threaded through the guide 3 and onto the drum 15, as before stated, the movement of the crank 50 in Fig. 1, will cause the rotation of the drive shaft 20, which carries the arm 19, and move the sliding frame 18 back and forth, which back and forth movement of the frame 18, causes the arm 17 to be oscillated by reason of its connection therewith to the bearings $17^f$ and $18^a$, but the arm 17 is moved a distance from the position shown in Fig. 4, until the pawl $17^b$ abuts the ratchet teeth of the ratchet disk $9^d$, before any movement of the ratchet disk $9^d$ takes place, and consequently the feed drum 9 remains at rest. As soon as the pawl $17^b$ engages the tooth of the ratchet disk $9^d$, the drum 9 will be operated and draw the strip 100 through the guide 3 a corresponding distance (equal to one envelop section). The limit of the movement of the drum 9 when in its feeding movement is repeated when the frame 18 is at its farthest distance to the left in Fig. 4, and as the frame 18 moves from left to right in Fig. 4, the pawl 17$^b$ will be carried backward without effecting the operation of the drum 9, the time elapsing between the stopping movement of the drum 9 and the commencement of its second movement being sufficient to enable the vendible strip or vendible article to be fed into the pocket by any desired means.

In the operation of the machine, should the envelop 100 creep forwardly, for any reason, the set screw 7$^d$ may be regulated to change the tension of the member 7$^c$ and counteract such forward creeping. This is done by tightening the screw 7$^d$. Should there be a "lag" in the movement of the envelop 100, the screw 7$^d$ may be loosened to relieve the tension on the envelop strip, and if this is not sufficient and the "lag" is caused by slipping of the belt 10, the shaft 12 may be turned slightly in its bearings 1$^y$ to tighten the belt 10.

From the foregoing it is thought the operation as well as the complete construction of our invention will be readily apparent to those skilled in the art to which the invention appertains and we desire it understood that slight changes in the details of construction may be readily made without departing from the spirit of the invention or the scope of the appended claims.

What we claim is:

1. A continuous envelop, step-by-step feeding mechanism, comprising a rotatable shaft, a reciprocating frame, crank connections between said shaft and frame, a feeding drum, a ratchet disk carried thereby, a rocker arm, connections between said rocker arm and said reciprocating frame, a pawl carried by said rocker arm to engage said ratchet disk, and means for winding up said envelop as it leaves said feeding drum, and operative connections between said winding up means and said feeding drum.

2. A continuous envelop, step-by-step feeding mechanism, comprising a rotatable shaft, a reciprocating frame, crank connections between said shaft and frame, a feeding drum, a ratchet disk carried thereby, a rocker arm, connections between said rocker and said reciprocating frame, a pawl carried by said rocker arm to engage said ratchet disk, means for winding up said envelop as it leaves said feeding drum, operative connections between said winding up means and said feeding drum, and means interposed in said operative connections for varying the action thereof to prevent the envelop from lagging in its movement.

3. A continuous envelop step-by-step feeding mechanism comprising a drive shaft, a feed drum and a winding-up drum, means for operating said feed drum from the drive shaft, means for operatively connecting said winding-up drum with the feed drum with means for adjusting said last named connecting means to prevent lagging in the movement of the envelop.

WILLIAM C. BRIGGS.
JAMES R. WILLIAMS.

Witnesses to W. C. Briggs's signature:
  C. T. LINEBOCK,
  H. B. PULLIAM.

Witnesses to J. R. Williams's signature:
  M. H. P. CLARK,
  JAMES L. ROBERTSON.

---

Copies of this patent may be obtained for five cents each, by addressing the "Commissioner of Patents, Washington, D. C."